US006751410B1

(12) United States Patent
Stavely

(10) Patent No.: US 6,751,410 B1
(45) Date of Patent: Jun. 15, 2004

(54) INERTIAL CAMERA STABILIZATION APPARATUS AND METHOD

(75) Inventor: Donald J. Stavely, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/617,471

(22) Filed: Jul. 10, 2003

(51) Int. Cl.[7] .................................................. G03B 17/00
(52) U.S. Cl. ......................................................... 396/55
(58) Field of Search ............................. 396/13, 52–55, 396/431; 359/554; 348/208.4, 208.7, 208.15

(56) References Cited

U.S. PATENT DOCUMENTS

| | | | | |
|---|---|---|---|---|
| 4,774,589 A | * | 9/1988 | Rowland | 348/208.7 |
| 4,862,277 A | * | 8/1989 | Iwaibana | 348/208.15 |
| 5,534,967 A | * | 7/1996 | Matsuzawa | 396/55 |
| 5,729,008 A | | 3/1998 | Blalock et al. | |
| 5,774,266 A | | 6/1998 | Otani et al. | |
| 5,809,346 A | * | 9/1998 | Fujisaki | 396/55 |
| 5,943,512 A | | 8/1999 | Hamada et al. | |
| 5,978,600 A | | 11/1999 | Takeuchi et al. | |
| 2003/0076421 A1 | | 4/2003 | Dutta | |

* cited by examiner

Primary Examiner—W. B. Perkey
(74) Attorney, Agent, or Firm—David W. Boyd

(57) ABSTRACT

A camera measures camera motion. Near the time of taking a photograph, the camera uses an actuator to accelerate an inertial element in a direction that counters the motion of the camera. The direction and duration of the acceleration are selected to momentarily reduce the camera rotation so that a photograph may be taken while the camera is relatively stable. Energy for actuating the inertial element may be stored in a capacitor. Several example means of monitoring the camera motion are disclosed, including an accelerometer, a rate gyroscope, and analysis of successive digital images. The inertial element may optionally be the rotor of a motor. The inertial element may optionally be the core of a solenoid. The camera may optionally use multiple actuators and masses to control shake in more than one degree of freedom. Methods of adapting the system to camera panning are disclosed.

59 Claims, 3 Drawing Sheets

INERTIAL CAMERA STABILIZATION APPARATUS AND METHOD

FIELD OF THE INVENTION

The present invention relates generally to photography.

BACKGROUND OF THE INVENTION

Image blur is a common problem in photography. Some common causes of blur in a photograph are subject motion, camera motion (shake), and focusing errors. Blur is a particular problem for casual or amateur photographers who may not know how to diagnose the causes of blur or how to change their photographic technique to improve their results. As new consumer camera models are being produced with zoom lenses capable of very long focal lengths, blur due to camera shake is especially troublesome.

Some simple approaches to reducing blur resulting from camera shake include placing the camera on a tripod, and using a faster shutter speed. However, a tripod may not be readily available or convenient in a particular photographic situation. Using a faster shutter speed is not always feasible, especially in situations with dim lighting. Shutter speed may be increased if a larger lens aperture is used, but larger-aperture lenses arc bulky and expensive and not always available. In addition, the photographer may wish to use a smaller lens aperture to achieve other photographic effects such as large depth of field.

Various devices and techniques have been proposed to help address the problem of image blur due to camera shake. For example, Murakoshi (U.S. Pat. No. 4,448,510) uses an accelerometer to detect camera shake, and provides an indication to the user of the camera if the acceleration exceeds a threshold level. The photographer can then make appropriate adjustments.

Satoh (U.S. Pat. No. 6,101,332) also senses camera shake, and combines the shake information with other camera parameters to estimate how much image blur might result. A set of light emitting diodes communicates the estimate to the photographer, who can then make adjustments.

Another approach has been to automate the camera operation, and let the camera choose settings that will minimize blur. For example, Bolle et al. (U.S. Pat. No. 6,301,440) applies a variety of image analysis techniques in an attempt to improve several aspects of photographs.

Some cameras or lenses are equipped with image stabilization mechanisms that sense the motion of the camera and move optical elements in such a way as to compensate for the camera shake. See for example Otani et al. (U.S. Pat. No. 5,774,266) and Hamada et al. (U.S. Pat. No. 5,943;512).

Each of these approaches has its drawbacks. The above techniques may require the addition of expensive and delicate electro-mechanical components to a camera, thereby increasing the camera cost. The techniques may require knowledgeable intervention from the photographer, possibly requiring equipment that is not at hand. Additional automation that reduces the photographer's control of the camera may add to the mystery of why a particular photograph is blurred.

A solution to the problem of image blur is needed that also addresses these difficulties.

SUMMARY OF THE INVENTION

A camera measures camera motion. Near the time of taking a photograph, the camera uses an actuator to accelerate an inertial element in a direction that counters the motion of the camera. The direction and duration of the acceleration are selected to momentarily reduce the camera rotation so that a photograph may be taken while the camera is relatively stable. Energy for actuating the inertial element may be stored in a capacitor. Several example means of monitoring the camera motion are disclosed, including an accelerometer, a rate gyroscope, and analysis of successive digital images. The inertial element may optionally be the rotor of a motor. The inertial element may optionally be the core of a solenoid. The camera may optionally use multiple actuators and masses to control shake in more than one degree of freedom. Methods of adapting the system to camera panning are disclosed.

DETAILED DESCRIPTION OF THE PREFERRED EMBODIMENT

Figure 1:
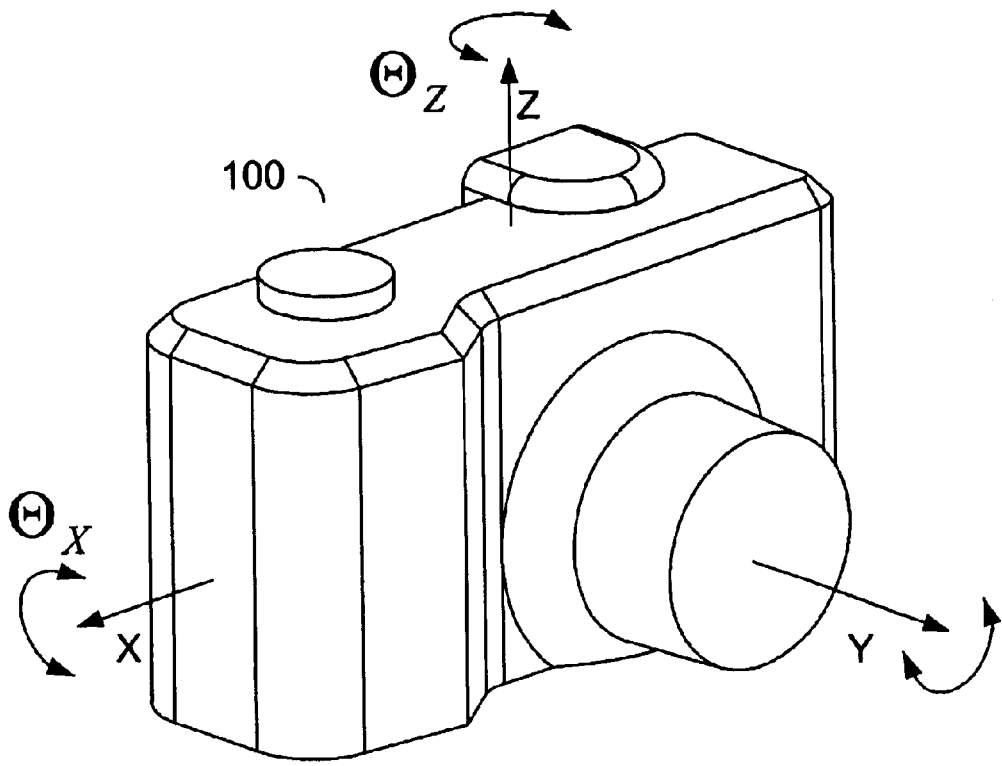
FIG. 1 depicts a camera and axes of rotation.

FIG. 1 depicts a camera 100 and an associated coordinate system. When a photographer holds a camera by hand, it is common for natural, involuntary hand movements to impart motion to the camera. Camera rotations with components about the X and Z axes introduce blur into photographs taken with the camera 100. The amount of blur introduced depends on the speed of the rotational motion, the exposure time of the photograph, and the magnification setting of the camera, usually indicated by the focal length of the lens.

In 35-millimeter photography, a commonly-cited rule of thumb states that the longest exposure time, measured in seconds, for which a camera can be reliably hand held is the reciprocal of the lens focal length, measured in millimeters. For example, when using a 50-millimeter lens, a camera could be hand held for exposure times of 1/50 second or faster. When using a 300-millimeter lens, an exposure time of 1/300 second or less is typically necessary for taking a sharp photograph without the aid of a tripod.

The motion imparted to the camera 100 by involuntary hand motions is typically oscillatory, and consists of vibrations in a frequency range of about 1 to 10 Hz. Rotations about the Z axis as shown in FIG. 1 are called "yaw", and motions about the X axis are called "pitch". Translational motions of the camera and rotations about the Y axis, called "roll", typically have negligible effects on image sharpness because the motions are not pronounced and because many photographs are taken at magnification ratios that minimize the effect of translational motions.

Figure 2:
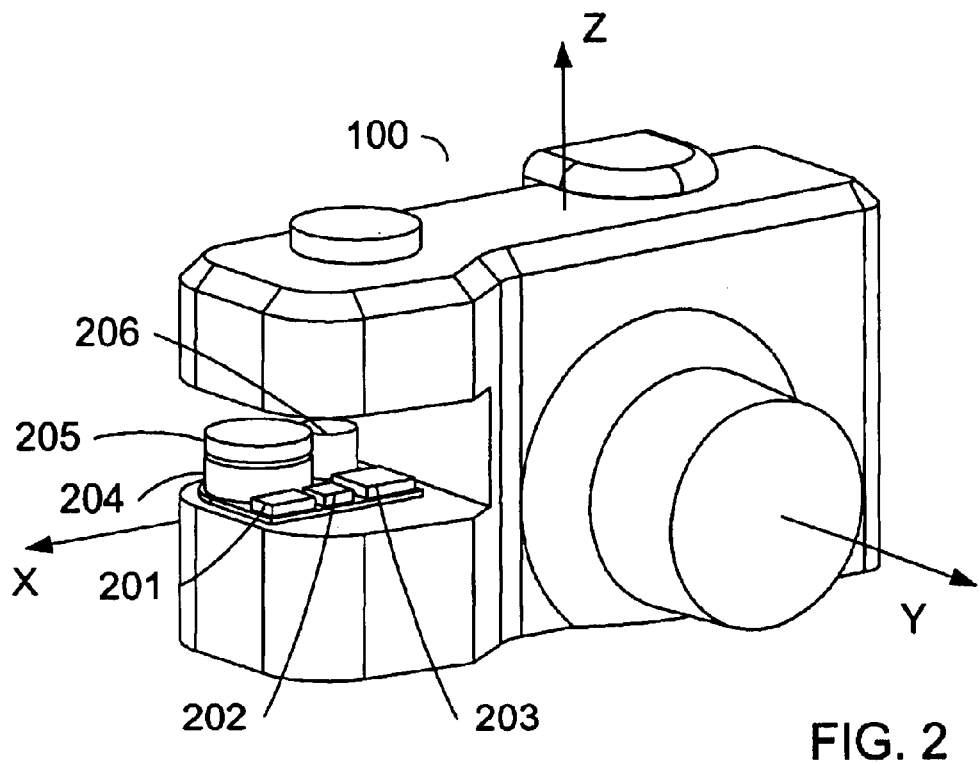
FIG. 2 depicts a cutaway view of a camera in accordance with an example embodiment of the invention.

FIG. 2 depicts a cutaway view of a camera in accordance with an example embodiment of the invention, showing apparatus for stabilizing the camera about the Z axis, thus compensating for yaw motions indicated by the variable $\theta_z$. Rotational accelerometer 201 measures camera accelerations about the Z axis. Rotational accelerometer 201 may be an LIS1R02 accelerometer, made by STMicroelectronics of Geneva, Switzerland, or the like. Integrator 202 integrates the acceleration information from rotational accelerometer 201, producing a signal indicating the rotational velocity of the camera about axis Z. Integrator 202 is of a kind known in the art. The velocity signal passes to logic and control unit 203, which combines the velocity information with other control information about the camera and controls motor 204. Motor 204 may optionally have an additional mass 205 attached to its shaft. Capacitor 206 may provide energy storage for driving the motor, as described below.

Figure 3:
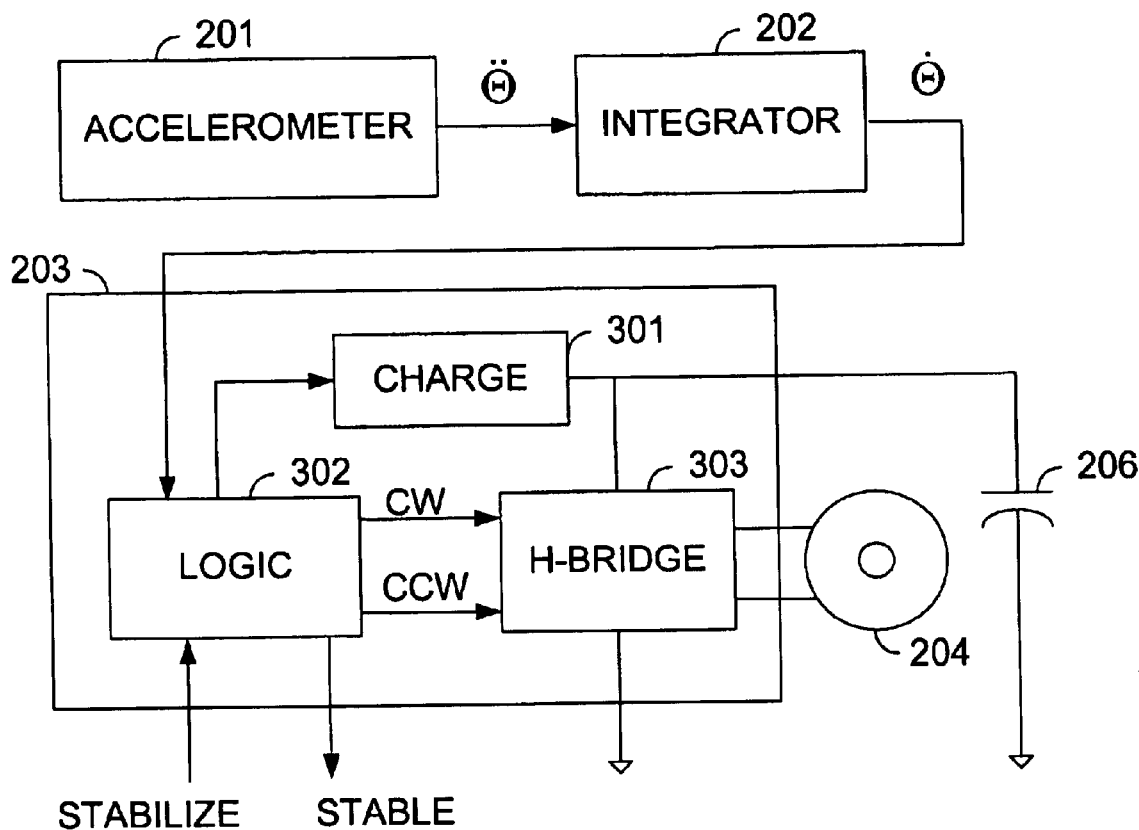
FIG. 3 depicts an electronic block diagram of a system in accordance with an example embodiment of the invention.

FIG. 3 depicts an electronic block diagram of a system in accordance with an example embodiment of the invention. Logic and control unit 203 may comprise a charging circuit 301 for charging capacitor 206. Charging circuit 301 may be similar to well-known charging circuits widely used in cameras to charge capacitors used to power flash or strobe lights. Using a capacitor for energy storage allows a relatively large amount of energy to be supplied to motor 204 in a relatively short time, and avoids a large, rapid drain on batteries that may supply power to camera 100. Logic unit 302 accepts a signal from integrator 202 indicating the rotational velocity of camera 100. Logic unit 302 also accepts a signal from other camera logic indicating that the camera is to be stabilized. For example, the STABILIZE signal may be activated when the photographer fully depresses a shutter release button on camera 100, or logic in camera 100 may activate the STABILIZE signal after exposure and focus operations have been completed.

Logic and control unit 203 may further comprise motor driving circuitry such as an H-bridge 303. In the example embodiment shown, H-bridge 303 allows motor 204 to be driven in either direction. The direction is selected by signals from logic unit 302 indicating whether the motor should rotate clockwise (CW) or counterclockwise (CCW). As shown, H-bridge 303 allows current to pass from capacitor 206 through motor 204 as long as either signal CW or signal CCW is activated. The system may allow all of the charge from capacitor 206 to dissipate through motor 204 by asserting signal CW or CCW for a sufficient time, or may allow only a portion of the charge to dissipate by asserting signal CW or CCW for only a short time and then de-asserting the signal.

A typical example sequence of operation of the system may be as follows. It is presumed that capacitor 206 has been previously charged by charging circuit 301. A rotational velocity signal is supplied by accelerometer 201 and integrator 202, and the STABILIZE signal is activated by other camera logic (not shown). The rotational velocity signal may be present continuously or it may be enabled after the activation of the STABILIZE signal. Logic unit 302 asserts a direction signal based on the direction of camera rotation indicated by the rotational velocity signal. For example, if the rotational velocity signal indicates that camera 100 is rotating clockwise, logic unit 302 asserts the CW signal, causing H-bridge 303 to pass current from capacitor 206 through motor 204 such that motor 204 begins to also rotate clockwise. (If the camera is rotating counter clockwise, logic unit 302 will select the CCW signal.)

Because the rotor of motor 204 has rotational inertia, the acceleration of motor 204 in the clockwise direction causes a reaction torque to be exerted on camera 100 in the counterclockwise direction, thus countering the clockwise rotation of the camera. The magnitude of the reaction torque depends on the torque constant of motor 204, the current passing through the motor, and the rotational inertia of motor 204 and any additional mass 205. By selecting motor 204 properly and accelerating motor 204 sufficiently vigorously, the counteracting torque exerted on camera 100 can be made sufficient to completely arrest the rotation of camera 100 about one axis.

Once the camera motion is arrested, and camera 100 is essentially stabilized, logic unit 302 may de-assert the CW signal, removing the motor torque, and may signal other camera logic that the camera is stable. For example, logic unit 302 may assert the STABLE signal. In response, the camera takes the photograph essentially immediately, before any disturbing forces re-accelerate the camera to a significant rotational velocity. Because camera oscillations due to hand holding typically have a frequency content of 1 to 10 Hz, the camera may be relatively motionless for up to several tens of milliseconds or more. A time interval of this duration is sufficient to considerably extend the ranges of photographic conditions for which handholding of the camera is feasible. For example, with a magnification ratio equivalent to a 300 millimeter focal length lens on a 35 millimeter format camera, an exposure time longer than about $1/300$ seconds, or about 3.3 milliseconds, may be infeasible without some form of camera stabilization. By way of example, if a stabilization system can allow the camera to be relatively rotation-free for 20 milliseconds, it becomes feasible to hand hold the camera with the same magnification ratio but with an exposure time of $1/50$ seconds, or 20 milliseconds. This example improvement corresponds to nearly three photographic stops, and affords the photographer significantly increased flexibility. As a further advantage, the acceleration of the inertial element may give the photographer useful tactile feedback when a photograph is taken.

Camera 100 may use the known characteristics of the camera 100, motor 204, additional mass 205, capacitor 206, and the speed of rotation of camera 100 to compute the amount of time that the CW or CCW signal should be asserted in order to arrest the camera rotation. This method is straightforward, but dependent on characteristics of the chosen components, such as the moment of inertia of camera 100, the capacitance of capacitor 206, the resistance and inductance of the windings of motor 204, the moment of inertia of motor 204 and any additional mass 205, the voltage to which capacitor 206 is charged, and other parameters.

Alternatively, logic unit 302 may monitor the rotational velocity of the camera during the stabilization and simply stop actuating the inertial element, by shutting off the current to motor 204, when the rotational velocity reaches essentially zero. Due to the inductance of motor 204, the actual acceleration of motor 204 may continue for a very brief time after the actuation is stopped. This technique is very similar to the operation of the flash or strobe in a camera with automatic flash metering. In that case, current to the electronic flash is interrupted when sufficient light has been received to properly expose a photograph. It is not necessary to compute the proper flash duration beforehand. Similarly, in the example embodiment of the present invention, it is not necessary to compute the counteracting torque duration beforehand.

Because capacitor 206 can be charged to relatively high voltages, for example, hundreds of volts, significant current can be passed through motor 204, and significant acceleration torque can be generated. Thus the camera stabilization can be done without adding significant delay to the photographic sequence.

Figure 4:
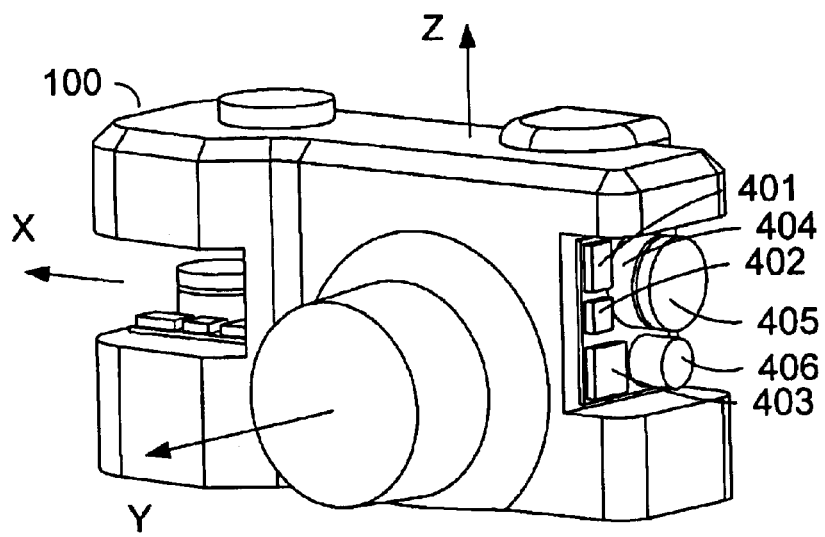
FIG. 4 shows a further cutaway view of the camera of FIG. 2.

FIG. 4 shows a further cutaway view of the camera of FIG. 2, including a second set of components for momentarily stabilizing the camera against rotations about the X axis. Second accelerometer 401 measures rotational accelerations about the X axis, and second integrator 402 obtains rotational velocity information from the acceleration information provided by accelerometer 401. The velocity signal passes to logic and control unit 403, which combines the information with other control information from camera 100 and controls motor 404. Motor 404 may optionally have an additional mass 405 attached. Capacitor 406 may store energy for driving motor 404.

One of skill in the art will recognize that other configurations of components can within the scope of the appended claims perform the functions described. For example, accelerometers 201 and 401 could be combined into a single package. Integrators 202 and 402 could be integrated with accelerometers 201 and 401, or could be integrated into logic and control units 203 and 403. Alternatively, the integration could be performed by a microprocessor under the control of a stored program, or by other logic. Charging circuit 301 need not be integrated into logic and control unit 203. A single capacitor could supply energy for stabilizing the camera in both degrees of freedom. One of skill in the art will recognize that a wide variety of other configurations is possible within the scope of the claims.

There is one photographic situation where the photographer may not wish the camera motion to be completely arrested when taking a photograph. In photographing a rapidly moving subject, for example a car in an auto race, holding the camera still and taking a photograph may result in a sharply focused photograph of the background, but the subject may be motion blurred. As an alternative, the photographer may "pan" the camera, following the subject and taking the photograph while the camera is moving. The result is a sharply focused photograph of the subject with a motion-blurred background. In this situation, having the camera attempt to arrest the motion may tend to defeat the photographer's purpose.

A system in accordance with an example embodiment of the invention may accommodate panning by the photographer in one of several ways. First, the system ay provide a control that allows the photographer to disable the image stabilization. Second, the system may automatically recognize that panning is occurring and simply not actuate the stabilization system. For example, if the speed of rotation of the camera is determined to be above a threshold value, such as 20 degrees per second, the camera may assume that the motion is intentional and decide not to try to compensate for it. Third, instead of controlling the system to momentarily drive the camera rotation to zero, the system may attempt to drive the camera rotation to its average value measured over a fixed time period, for example, the 0.5 seconds immediately preceding the taking of a photograph.

Figure 5:
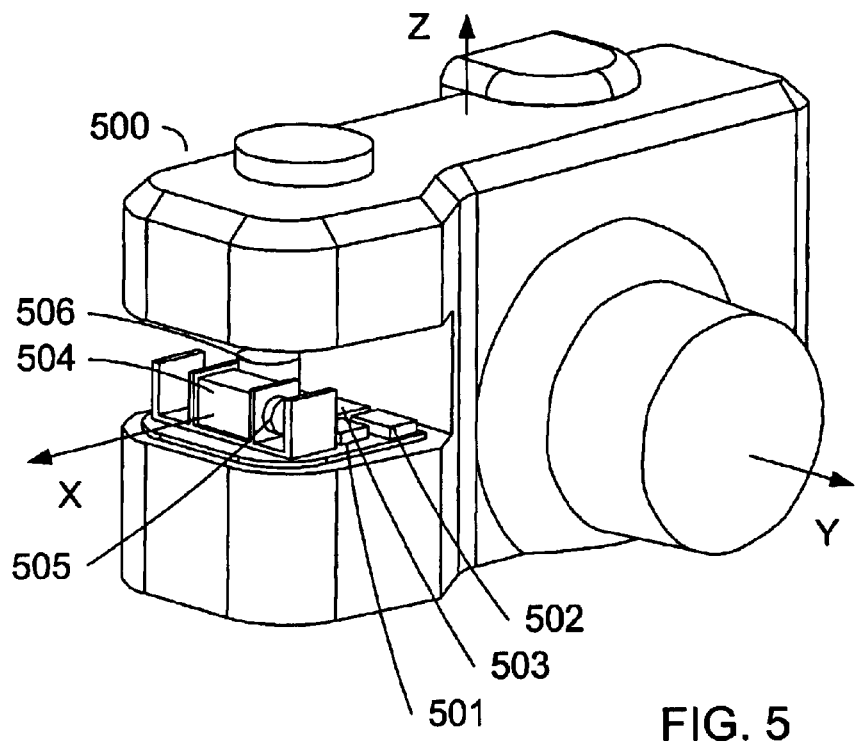
FIG. 5 depicts a cutaway view of a camera using a solenoid to stabilize the camera.

In another example embodiment of a system for inertial momentary camera stabilization, the system uses solenoids rather than motors to accomplish the camera stabilization. FIG. 5 depicts a cutaway view of a camera 500 using a solenoid 504 to stabilize the camera 500 against rotation about the Z axis, A similar set of components may be used to stabilize the camera 500 against rotation about the X axis.

A solenoid moves a core in response to electric current flowing in the windings. The force exerted on the core, and thus its acceleration, is dependent on the particular configuration of the windings, the material of the core, the geometry of the solenoid, and the amount of current flowing in the windings, among other factors. As the core 505 of solenoid 504 is accelerated, a reaction force is exerted on camera 500. Because solenoid 504 is placed away from the center of mass of camera 500, the force also creates a moment tending to rotate camera 500. When core 505 of solenoid 504 is accelerated in the direction of rotation of camera 500, the reaction force tends to counteract the rotation of camera 500. Given sufficient acceleration of core 505, the rotation of camera 500 can be momentarily stopped. The control and operation of the system using a solenoid is similar to the control and operation of the system using a motor. An accelerometer 501 and integrator 502 measure the rotational velocity of camera 500. Capacitor 506 may store energy of actuating solenoid 504. Logic and control unit 503 receives the rotational velocity information from integrator 502 and controls the actuation of solenoid 504.

A system may optionally use two solenoids for an axis of camera rotation to be compensated. The two solenoids may be placed on opposite sides of the center of mass of camera 500, and actuated in opposite directions, thereby accelerating the camera in a more purely rotational manner than may occur with a single solenoid per axis.

In another example embodiment of a system for inertial momentary camera stabilization, the camera is a digital camera, and rotation of the camera is sensed by analyzing successive digital images of the scene being photographed. A digital camera typically projects an image of a scene onto an electronic array light sensor. The electronic array light sensor provides an ordered array of sites that sense the brightness of light emanating from corresponding locations in the scene being photographed. The camera converts the measurements of scene brightness into an ordered array of numbers in which each array element corresponds to a scene location, and the numerical value of each array element represents the brightness of that element's corresponding scene location. Each sensor site may be referred to as a "pixel". The term "pixel" may also refer to an element of the numerical array. The meaning is typically clear from the context of the reference. The array of numbers may also be called a digital image, and, when properly interpreted and displayed, reproduces the scene that was photographed.

Figure 6A:
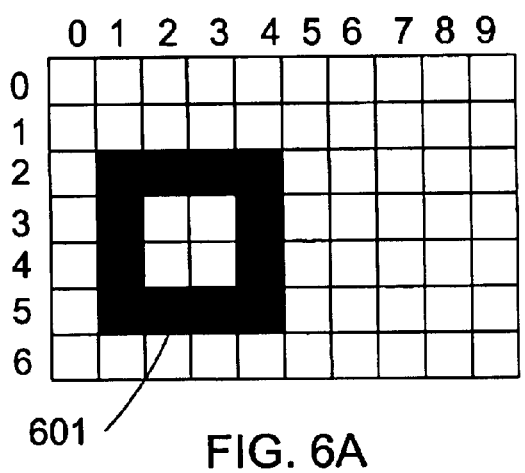
FIGS. 6A and 6B show two example successive digital images taken of a simplified scene.
Figure 6B:
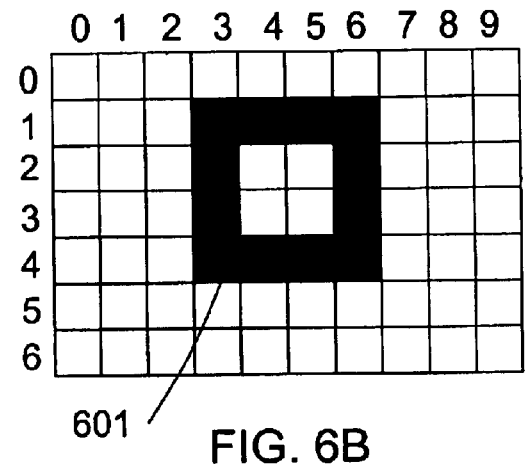

By comparing two successive digital images and assuming that the photographic subject was stationary, it is possible to estimate any camera motion that may have occurred in the time interval between the takings of the successive images. FIGS. 6A and 6B show two example successive digital images taken of a simplified scene. Each small square in the sample images of FIGS. 6A and 6B represents one pixel. Only a few pixels are shown for clarity, and a grid delineating the pixel boundaries is shown for ease of reference. An actual digital image produced by a digital camera my have many thousands or millions of pixels.

In FIG. 6A, feature 601, a hollow black square, is situated in the digital photograph with its lower left comer at the pixel in row 5 and column 1. In FIG. 6B, a digital image taken some time later, feature 601 has apparently shifted so that its lower left corner is at the pixel in row 4 and column 3. Assuming that the scene containing feature 601 has not moved, the apparent movement of feature 601 is the result of camera motion. Assuming further that feature 601 is a relatively large distance away from the camera so that translation of the camera will have negligible effect, the apparent shift of feature 601 is the result of camera rotations. In the time interval between the digital images in FIGS. 6A and 6B, the camera has rotated toward the photographer's left enough to shift the image of feature 601 right by two pixels and downward enough to shift the image of feature 601 up by one pixel. Given the apparent image shift in pixels, the camera's pixel size, and the magnification setting of the camera's optical system, one of skill in the art can easily compute the angle through which the camera rotated. Given further the time interval between the successive digital images, the velocity of camera rotation is easily computed.

Determining the apparent image shift can be accomplished by correlation analysis of the two successive images. U.S. Pat. No. 5,729,008 to Blalock, et al., titled "Method and Device for Tracking Relative Movement by Correlating Signals from an Array of Photoelements" and having a common assignee with the present application, describes a method and apparatus for measuring the apparent shift of a feature in successive digital images. That patent is hereby incorporated for all that it contains.

In another example embodiment of a system for inertial momentary camera stabilization, rotation of the camera is sensed using one or more rate gyroscopes. Examples of compact rate gyroscopes include the Gyrostar model available from Murata Manufacturing Co., Ltd., of Kyoto, Japan, and model number ADXRS150 available from Analog Devices, Inc., of Norwood, Mass. Using a rate gyroscope for measuring camera rotation has the advantage that the rate gyroscope produces a velocity signal directly, and does not require the use of an integrator. One rate gyroscope may be used for each axis of camera rotation to be measured.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A camera, comprising:
   a) a motor that is accelerated, in response to rotation of the camera, such that reaction torque induced by the acceleration acts to counter rotation of the camera; and
   b) a capacitor that stores energy for driving the motor.

2. The camera of claim 1 wherein an additional mass is attached to the rotor of the motor.

3. The camera of claim 1, further comprising an accelerometer that measures rotational movements of the camera.

4. The camera of claim 3 wherein the accelerometer is a rotational accelerometer.

5. The camera of claim 3 wherein an acceleration signal provided by the accelerometer is integrated to determine a rotational velocity of the camera.

6. The camera of claim 5 wherein the integration is performed by an integration circuit.

7. The camera of claim 5 wherein the integration is performed by logic executing a stored program.

8. The camera of claim 7 wherein the logic is a microprocessor.

9. The camera of claim 1 wherein the rotation of the camera is measured using a rate gyroscope.

10. The camera of claim 1 wherein the camera is a digital camera.

11. The camera of claim 10 wherein rotation of the camera is measured by analyzing successive digital images taken by the camera.

12. The camera of claim 1, further comprising a second motor that is accelerated such that reaction torque induced by the acceleration acts to counter rotation of the camera about an axis of rotation different from the axis of rotation about which rotation of the camera is countered by acceleration of the first motor.

13. The camera of claim 1 wherein the motor is accelerated for a duration computed before the acceleration based on a rotational velocity of the camera.

14. The camera of claim 1 wherein a rotational velocity of the camera is monitored, and the actuation of the motor is stopped when the rotational velocity becomes essentially zero.

15. The camera of claim 14 wherein the actuation of the motor is stopped by interrupting a flow of current from the capacitor.

16. The camera of claim 1 wherein the reaction torque reduces a rotational velocity of the camera momentarily essentially to zero, and the camera takes a photograph while the camera is relatively stable.

17. A camera, comprising a solenoid having a core, the core of the solenoid accelerated in response to rotation of the camera such that reaction torque induced by the acceleration acts to counter rotation of the camera.

18. The camera of claim 17, further comprising an accelerometer that measures rotational movements of the camera.

19. The camera of claim 18 wherein the accelerometer is a rotational accelerometer.

20. The camera of claim 18 wherein an acceleration signal provided by the accelerometer is integrated to determine a rotational velocity of the camera.

21. The camera of claim 20 wherein the integration is performed by an integration circuit.

22. The camera of claim 20 wherein the integration is performed by logic executing a stored program.

23. The camera of claim 22 wherein the logic is a microprocessor.

24. The camera of claim 17 wherein the camera is a digital camera.

25. The camera of claim 24 wherein rotation of the camera is measured by analyzing successive digital images taken by the camera.

26. The camera of claim 17, further comprising a second solenoid having a second core that is accelerated such that reaction torque induced by the acceleration acts to counter rotation of the camera about an axis of rotation different from the axis of rotation about which rotation of the camera is countered by acceleration of the first solenoid core.

27. The camera of claim 17 wherein the solenoid core is accelerated for a duration computed before the acceleration based on a rotational velocity of the camera.

28. The camera of claim 17 wherein a rotational velocity of the camera is monitored, and the actuation of the solenoid core is stopped when the rotational velocity becomes essentially zero.

29. The camera of claim 17, further comprising a capacitor that stores energy for the actuation of the solenoid core.

30. The camera of claim 29 wherein actuation of the solenoid core is stopped by interrupting a flow of current from the capacitor.

31. The camera of claim 17 wherein the reaction torque reduces a rotational velocity of the camera momentarily essentially to zero, and the camera takes a photograph while the camera is relatively stable.

32. The camera of claim 17, further comprising a second solenoid, the actuation of which counters camera rotation in the same axis as actuation of the it solenoid, and wherein the second solenoid is placed on the opposite side of the camera center of mass from the first solenoid, and is actuated in the opposite direction as the first solenoid.

33. A method of stabilizing a camera, comprising the steps of:
   a) measuring a rotational velocity of the camera;
   b) storing energy in a capacitor; and
   c) accelerating the rotor of a motor, using energy from the capacitor, in response to the rotational velocity of the camera, such that a reaction torque induced by the acceleration reduces the rotational velocity of the camera.

34. The method of claim 33, further comprising the step of accelerating a rotor of a second motor such that a reaction torque induced by the second acceleration reduces a rotational velocity of the camera in a degree of freedom different from that affected by the acceleration of the first motor rotor.

35. The method of claim 33 further comprising the step of taking a photograph while the rotational velocity is reduced.

36. The method of claim 33, further comprising the steps of:
   a) monitoring the rotational velocity of the camera; and
   b) stopping the actuation of the motor when the rotational velocity approaches zero.

37. The method of claim 33, further comprising the steps of:
   a) computing a duration for the acceleration based on the rotational velocity of the camera; and
   b) accelerating the rotor of the motor for the computed duration.

38. The method of claim 33, further comprising the steps of:
   a) monitoring a rotational acceleration of the camera; and
   b) integrating the rotational acceleration to obtain the rotational velocity of the camera.

39. The method of claim 38 wherein the step of integrating the rotational acceleration to obtain the rotational velocity of the camera is performed by logic executing a stored program.

40. The method of claim 33, further comprising the step of stopping the actuation of the motor by interrupting the flow of current from the capacitor.

41. The method of claim 33 wherein the step of measuring the rotational velocity of the camera is accomplished by analyzing successive digital images taken by the camera.

42. The method of claim 33 wherein the step of measuring the rotational velocity of the camera is accomplished using an accelerometer.

43. A method of stabilizing a camera, comprising the steps of:
   a) measuring a rotational velocity of the camera; and
   b) accelerating, in response to the rotational velocity of the camera, the core of a solenoid, such that reaction torque induced by the acceleration acts to reduce the rotational velocity of the camera.

44. The method of claim 43, father comprising the step of accelerating a core of a second solenoid such that a reaction torque induced by the second acceleration reduces a rotational velocity of the camera in a degree of freedom different from that affected by the acceleration of tho first solenoid core.

45. The method of claim 43, further comprising the step of taking a photograph while the rotational velocity of the camera is reduced.

46. The method of claim 43, further comprising the steps of:
   a) monitoring the rotational velocity of the camera; and
   b) stopping the actuation of the solenoid core when the rotational velocity approaches zero.

47. The method of claim 43, further comprising the steps of:
   a) computing a duration for the acceleration based on the rotational velocity of the camera; and
   b) accelerating the core of the solenoid for the computed duration.

48. The method of claim 43, further comprising the steps of:
   a) monitoring a rotational acceleration of the camera; and
   b) integrating the rotational acceleration to obtain the rotational velocity of the camera.

49. The method of claim 48 wherein the step of integrating the rotational acceleration to obtain the rotational velocity of the camera is performed by logic executing a stored program.

50. The method of claim 43 wherein the step of measuring the rotational velocity of the camera is accomplished by analyzing successive digital images taken by the camera.

51. The method of claim 43 wherein the step of measuring the rotational velocity of the camera is accomplished using an accelerometer.

52. The method of claim 43, further comprising the step of storing energy in a capacitor for actuating the solenoid core.

53. The method of claim 52, further comprising the step of stopping the actuation of the solenoid core by interrupting a flow of current from the capacitor.

54. A camera, comprising:
   a) means for measuring a rotational velocity of the camera; and
   b) means for producing, by accelerating an inertial element using energy stored in a capacitor, in response to the rotational velocity of the camera, a torque that reduces the rotational velocity of the camera.

55. A camera, comprising:
   a) a rate gyroscope that measures rotation of the camera; and
   b) a solenoid having a core, the solenoid core being accelerated such that reaction torque induced by the acceleration acts to counter rotation of the camera.

56. A camera, comprising:
   an inertial mass that, near the time of taking a photograph, is accelerated in response to rotation of the camera such that reaction torque induced by the acceleration acts to counter rotation of the camera when a speed of the rotation is below a predetermined value, and wherein the inertial mass is not accelerated when the speed of rotation exceeds the predetermined value; and
   a capacitor that stores energy for accelerating the inertial mass.

57. A camera, comprising an inertial mass that, near the time of taking a photograph, is accelerated in response to rotation of the camera such that reaction torque induced by the acceleration acts to drive the rotation of the camera to an average speed measured over a predetermined preceding interval; and a capacitor that stores energy for accelerating the inertial mass.

58. A camera, comprising a solenoid having a core, and wherein, near the time of talking a photograph, the solenoid core is accelerated in response to rotation of the camera such that reaction torque induced by the acceleration acts to counter rotation of the camera when a speed of the rotation is below a predetermined value, and wherein the solenoid core is not accelerated when the speed of rotation exceeds the predetermined value.

59. A camera, comprising a solenoid having a core, and wherein, near the time of taking a photograph, the solenoid core is accelerated in response to rotation of the camera such that reaction torque induced by the acceleration acts to drive the rotation speed of the camera to an average speed measured over a predetermined preceding interval.

* * * * *